UNITED STATES PATENT OFFICE.

WILLIAM M. TURNER, OF WOODLAND, CALIFORNIA, ASSIGNOR OF ONE-HALF TO G. G. WICKSON, OF SAN FRANCISCO, CALIFORNIA.

CHEESE-MAKING.

SPECIFICATION forming part of Letters Patent No. 567,522, dated September 8, 1896.

Application filed November 29, 1895. Serial No. 570,533. (No specimens.)

*To all whom it may concern:*

Be it known that I, WILLIAM M. TURNER, a citizen of the United States, residing at Woodland, in the county of Yolo and State of California, have invented certain new and useful Improvements in Cheese-Making; and I do hereby declare that the following is a full, clear, and exact description thereof.

My invention relates to the making of cheese; and my object is mainly to effect a more perfect separation of the whey from the curd, and thus to produce a better article, and, further, to hasten the process of cheese-making, thus saving a considerable amount of labor and time ordinarily required in getting the product ready for the market.

In cheese-making, as commonly practiced, the whey is imperfectly separated from the curd by draining in a vat and by pressing in a cheese-press, a process which, in addition to its ineffectiveness, is slow and requires an undue amount of labor. By the process which I shall proceed to describe I accomplish an effective separation of the whey, with the result that I obtain an increased yield of cheese proportionately to the amount of milk employed, accomplish a saving of butter-fat in the cheese, more or less of which, by the old process, escapes with the whey, and produce a cheese of closer and firmer quality, yet having the moisture and tenderness which are characteristic of the curd.

In carrying out my process I do not depend upon the vat and press as the means of separating the whey by drainage and pressure. Instead I subject the curds and whey, while heated, to rapid circular agitation, which throws out the thin whey by centrifugal force, and which at the same time forces air through the curd and drives out any gases or bad flavors.

Such apparatus as may be required for heating the milk and curd form no part of my present invention, nor have I described or shown such apparatus, as, mechanically considered, they are well known.

My process begins with the heating of milk to a temperature of about 86° Fahrenheit. Sufficient rennet is then put into the milk to coagulate it, which usually requires from twenty to forty minutes. The curd is then cut into cubes of about one-half inch and the whole mass reheated to a higher temperature, which varies according to the season, climate, and other conditions, and, in practice, I have found a temperature of from 98° to 104° Fahrenheit to produce the best results. The heated curds and whey are now ready for separation in the manner before referred to, which is accomplished by placing them in a receptacle capable of being rapidly rotated and having perforated or screen walls, or otherwise constructed so as to allow the thin whey to be thrown off, but to retain the curd. Any gases which would give a bad flavor to the cheese or tend to cause decay will also be driven off by the air which is drawn and forced through the curd by the rapid rotation. I have found that all the whey may be in this way thrown out, and that the separation is accomplished far more rapidly than is possible when the vat and press are depended upon. The solid curd is now removed from the vessel and placed in a suitable retort having means, such as a steam jacket or pipes, for keeping the temperature up to the beforementioned cooking-point of 98° to 104° Fahrenheit. This temperature is maintained until the curd commences to flake or until the hot-iron test shows sufficient acid to form a good solid curd in the opinion of the cheesemaker. The curd is then salted and is ready to be pressed or molded to the desired shape.

This process can be used in the manufacture of all kinds of cheese, such as Swiss, Limburger, and brick. The cheese is firm and solid, yet moist and tender, and shows fewer pin-holes. It is a better cheese than can be made by the old process and has the industrial advantage of being made more rapidly and hence more economically.

What I claim is—

1. The herein-described method of making cheese consisting of heating the milk, coagulating the heated milk, dividing up the curd and reheating it, and separating the curds and whey by centrifugal action, substantially as described.

2. The herein-described method of making cheese consisting in heating the milk, coagulating the heated milk, dividing up the curds and reheating to a higher temperature, separating the curds and whey by centrifugal action, and removing the solid curd and subjecting to heat, substantially as described.

In testimony whereof I have affixed my signature, in presence of witnesses, this 20th day of November, 1895.

WILLIAM M. TURNER.

Witnesses:
 M. M. FISHER,
 NICHOLAS A. HAWKINS,
 THADDEUS S. SPAULDING.